Jan. 11, 1927.                    H. ZUBER                    1,614,094
                              MILK BOTTLE CAP
                           Filed March 22, 1926
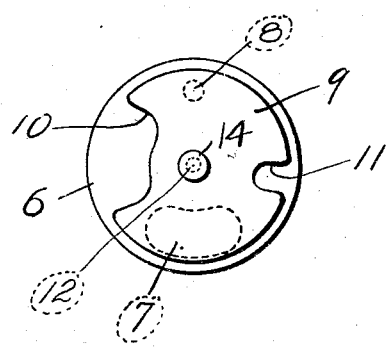
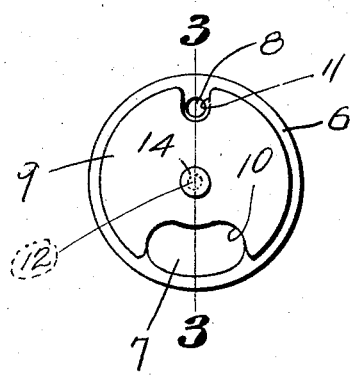
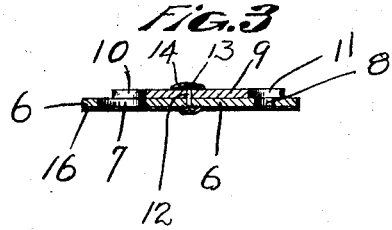
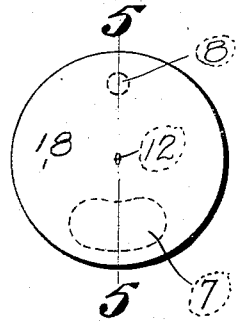
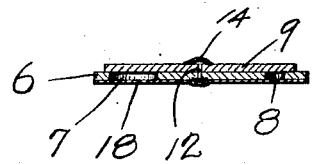
INVENTOR
HERMAN ZUBER
BY Edward E. Longan
ATTY.

Patented Jan. 11, 1927.

1,614,094

UNITED STATES PATENT OFFICE.

HERMAN ZUBER, OF MURPHYSBORO, ILLINOIS, ASSIGNOR OF ONE-THIRD TO GOTTLIEB ZUBER, OF ST. LOUIS, MISSOURI, AND ONE-THIRD TO EMIL C. ZUBER, OF BOWLING GREEN, MISSOURI.

MILK-BOTTLE CAP.

Application filed March 22, 1926. Serial No. 96,494.

My invention relates to improvements in milk bottle caps, and has for its primary object a milk bottle cap which is so constructed that the contents of the bottle can be removed without in any way disturbing the position of the cap.

A further object is to construct a milk bottle cap which is provided with a pouring opening and an air vent and which has a pivoted valve mounted thereon so that said openings can be closed thereby preventing foreign substances from coming in contact with the milk.

In the drawings:

Fig. 1 is a top plan view of my improved cap with the valve in closed position;

Fig. 2 is a similar view with the valve in open position;

Fig. 3 is a cross section taken on the line 3—3 of Fig. 2;

Fig. 4 is a bottom plan view of a modified form of cap; and

Fig. 5 is a section taken on the line 5—5 of Fig. 4.

In the construction of my device I employ a cap which is composed of a disk 6. This disk is preferably constructed of parafined material similar to the ordinary milk bottle cap. The disk 6 is provided with a pouring opening 7 and a diametrically arranged air vent 8, the pouring opening, however, being elongated. Located on the disk 6 is a disk 9 which has a cutaway portion 10 formed in its periphery, this cutaway portion being of sufficient size so as to clear the opening 7. This is clearly illustrated in Fig. 2. Diametrically opposite the cutaway portion 10 is formed a notch 11, which is adapted to register with the opening 8 when the cutaway portion 10 registers with the opening 7. The disks 6 and 9 are pivotally secured together by means of a rivet or stud 12. The stud 12 is provided with a head 13 over which is secured a disk 14. This disk is preferably of waxed paper. This precludes any metal being exposed on the outside of the cap. Secured to the underside of the disk 6 is a sheet 15 of parchment or waxed paper which extends over the bottom edge of the rivet 12. This sheet precludes any possibility of the milk or other liquid in the container contacting with the metal, which might possibly cause the liquid to become unfit for human consumption. The sheet 15 is provided with openings 16 and 17, which register with the openings 7 and 8 respectively.

In Figures 4 and 5 I have shown a modified form of construction in which a sheet of material 18, such as waxed paper or the like, is made in the form of an imperforate disk and secured to the bottom of the disk or cap 6. When my device is constructed in this manner, it is necessary, before the pouring operation can be commenced, to use a sharp knife and cut out that portion of the disk 18 underneath the opening 7 to permit the egress of liquid from the bottle, it being only necessary to use a toothpick or other sharp instrument to perforate the disk at the opening or air vent 8. In this way milk can be shipped any distance without any possibility of its contents becoming contaminated and upon arriving at its destination it is an easy matter to cut away the disk 18 at the openings without removing the cap and pour some of the contents from the bottle. Upon desiring to close the bottle, it is only necessary to revolve the valve 9 into the position shown in Fig. 1 when both the vent and pouring openings will be closed so that absolutely no foreign matter or insects can get to the milk.

The present method of handling milk, especially in restaurants and similar places is to push one end of the cap down into the bottle, thus raising the other end and pour the milk. The usual practice then is to set the bottle with the tilted cap on a shelf or some place where the flies find ready access and even where the cap is pushed back it is in constant contact of the fingers with the cap which renders the same unsanitary for the reason that the milk being poured is bound to contact with the edges of the cap, which have been contacted with by the fingers, and milk being very susceptible to pollution will pick up any germs that might be on the fingers and left on the cap by this repeated process of tipping or tilting the cap. Other caps have been devised with a flap which can be pulled outward and must then be pressed back inward again, but in all of these devices the same danger of contamination is present.

In operating my device it is not my intention that the fingers of the operator shall at any time touch the valve 7 along the edges of the opening 10 but all swiveling or turning of the valve is to be accomplished by contact with the notch 11 which, acting only as an air vent or rather to uncover the air vent, does not come in contact with any of the dispensed milk, so in this respect all danger of contamination by contact with the fingers is eliminated.

My device can be as readily applied to an ordinary milk bottle as is the present style of paper cap, and in addition to the present paper cap, has all the advantages of again closing up the bottle after a portion of its contents have been removed and securing the contents of the bottle against the encroachment of insects or germs.

Having fully described my invention, what I claim is:—

1. A milk bottle cap comprising a disk having a pouring opening and an air vent, and a second disk located on top of said first mentioned disk a pivot for rotatably securing said disks together, said last mentioned disk adapted to be rotated so as to open and close the openings in the first mentioned disk, and means carried by the undersurface of the first mentioned disk for covering said pivot.

2. A milk bottle cap comprising a disk having a pouring opening and an air vent formed therethrough, a second disk of less diameter than the first mentioned disk concentrically superimposed thereon a pivot for rotatably securing said disks together there being notches formed in the periphery of the second mentioned disk adapted to be brought into and out of register with the openings in the first mentioned disk when the second mentioned disk is rotated, and means for covering said pivot so as to prevent the contents of the bottle from contacting therewith.

3. A milk bottle cap comprising a disk having a pouring opening and a vent opening formed therethrough, a second disk provided with cut-away portions concentrically located on one face of said first mentioned disk, a pivot passing thru the center of both disks so that said second mentioned disk can be rotated and the cutaway portions be brought into coincidence with the openings in the first mentioned disk whereby the contents of a bottle to which said cap is applied can be discharged without removing said cap, and means carried by the first mentioned disk for preventing the contact of the bottle contents with the pivot.

4. A milk bottle cap comprising a disk having a pouring opening and a vent opening formed therethrough, a second disk located on said first mentioned disk, a pivot for rotatably securing said disks together, said second mentioned end disk adapted during its rotation to open and close the pouring and vent openings in the first mentioned disks simultaneously whereby the contents of a bottle to which said disk is applied can be removed and protected without removing the first mentioned disk, and a sheet of moisture-proof material secured to the inside of the first mentioned disk whereby contact between the pivot and the bottle contents is prevented.

In testimony whereof I have affixed my signature.

HERMAN ZUBER